May 4, 1965   E. W. JACKOBOICE   3,181,825
GENERATOR PUMP AND BRACKET ASSEMBLY
Filed Aug. 8, 1963   2 Sheets-Sheet 1

INVENTOR.
EDWARD W. JACKOBOICE
BY
*Price & Heneveld*
ATTORNEYS

May 4, 1965 E. W. JACKOBOICE 3,181,825
GENERATOR PUMP AND BRACKET ASSEMBLY
Filed Aug. 8, 1963 2 Sheets-Sheet 2

INVENTOR.
EDWARD W. JACKOBOICE
BY
ATTORNEYS

3,181,825
GENERATOR PUMP AND BRACKET ASSEMBLY
Edward W. Jackoboice, Grand Rapids, Mich., assignor to Monarch Road Machinery Company, Grand Rapids, Mich., a corporation of Michigan
Filed Aug. 8, 1963, Ser. No. 301,936
10 Claims. (Cl. 248—16)

This application is a continuation-in-part application of my co-pending application Serial No. 225,026 filed September 26, 1962 and entitled Universal Bracket for Pump Mounts on Generators, now abandoned.

This invention relates to vehicular hydraulic pump support equipment, and more particularly to a hydraulic pump and universal pump mounting bracket adapted for mounting the pump to a generator or alternator of a vehicle in any posistion to suit particular space requirements.

Hydraulic pumps are widely employed on vehicles for supplying pressurized fluid to fluid cylinders used for hoisting and lowering snow plows, as well as other devices. The pump is ordinarily rotatably driven by the vehicle engine, using a V-belt driven from a pulley on the front end of the engine drive shaft. The pulley of the pump is therefore aligned with the front of the engine. In my prior United States Patent No. 2,508,756 is disclosed and claimed a special clamp which fastens around the body of a vehicle generator and supports the hydraulic pump. This prior bracket has been used commercially for many years and serves the purpose very well. However, since most automotive vehicles have their generators or alternators located in different positions in the engine compartment, and have varying amounts of space at different locations around the generator to receive the hydraulic pump, it is necessary to produce and sell a plurality of these brackets to accommodate the different vehicles. More specifically, sometimes the pump fits only on top of the generator, sometimes on one side, sometimes on the other side, and sometimes beneath it, depending upon the space remaining in the engine compartment around the generator. This also depends somewhat upon the arrangement of the drive belt or belts at the front of the engine. Presently, therefore, the assignee herein, Monarch Road Machinery Company, manufactures and sells dozens of dimensional variations of the pump bracket disclosed in the U.S. Patent No. 2,508,756 to accommodate the various makes of trucks, automobiles, Jeeps and other road equipment employing the bracket. The resulting number of manufacturing steps for the many different model variations is therefore large. Further, the constant inventory required for the many brackets is great. The many model variations also increases the number of wrong orders erroneously sent to customers. This prior bracket must also be very tightly connected around the girth of the generator housing to prevent it from slipping rotationally.

It is therefore an object of this invention to provide a pump and pump bracket assembly for mounting a hydraulic pump directly to the mounting lugs of a conventional automobile generator or alternator, and which is adaptable to any type of vehicle using the same bracket components, thereby completely eliminating the need for manufacturing and maintaining an inventory of a great number of model variations.

It is another object of this invention to provide a hydraulic pump and universal pump bracekt assembly with the capacity to support the hydraulic pump above, below or on either side of an alternator or generator to suit the particular space characteristics of the engine compartment involved. The assembly is capable of accommodating all types and makes of vehicles, whether a truck, a Jeep, an automobile, or some other road vehicle, regardless of the make or model. Only one type of bracket assembly need be manufactured and maintained in inventory, since the unit is interchangeable between vehicles. This interchangeability also saves the purchaser money when changing vehicles and retaining the pumping equipment. Furthermore, errors in orders of the bracket to customers are eliminated since the one bracket satisfies all orders.

It is another object of this invention to provide a pump bracket that cannot slip since it is mounted to the fixed lugs of the generator.

It is another object of this invention to provide a pump mounting and driving assembly enabling the pump to be mounted to the lugs of a generator and driven directly from the generator.

These and other objects of this invention will be apparent upon studying the following specification in conjunction with the drawings in which:

FIG. 2 is a front elevational view of the apparatus in FIG. 1 without the pump, and showing the bracket arms in a slightly different position;

Figure 1:
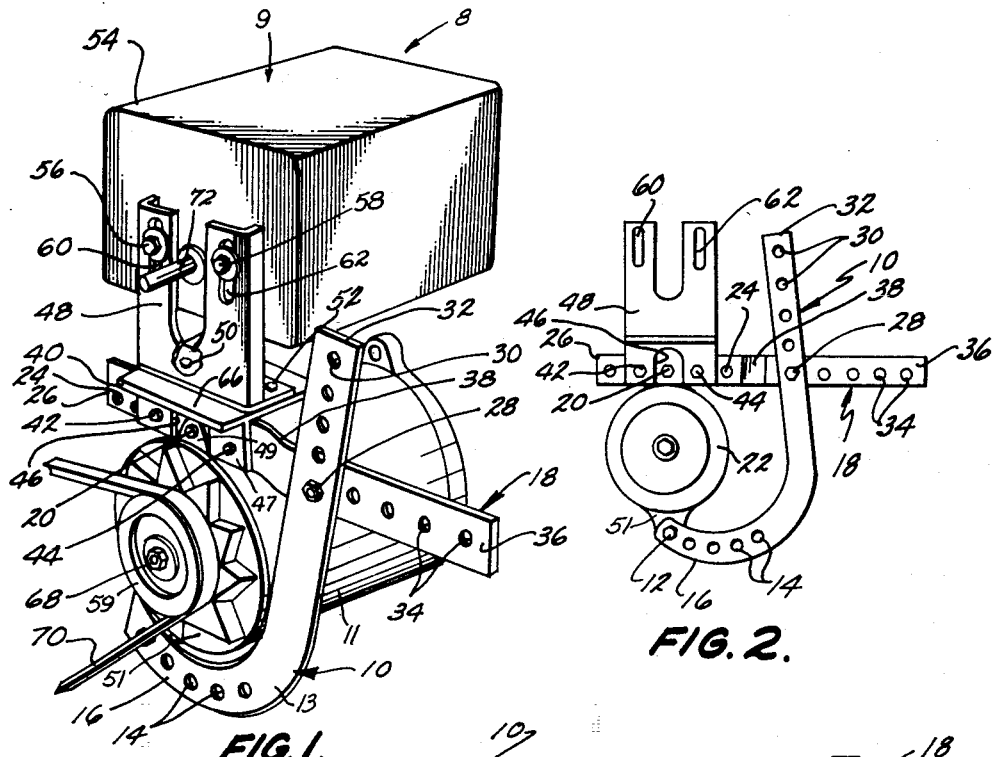
FIG. 1 is a perspective view illustrating one form of the bracket mounted on the lugs of a generator and supporting a hydraulic pump.

Referring specifically to the drawings, the assembly 8 includes the hydraulic pump 9, the conventional generator or alternator 11, and the universal bracket assembly 10.

The bracket has a curved, J-shaped leg 13, a straight cross leg 18, and a pump support mount plate 48. The mount 48 is bifurcated. If desired, a platform support 66 may be inserted intermediate the straight leg 18 and the mount plate 48. Alternately, the mount 48 may include an integral portion attached directly to the cross leg 18.

The hydraulic pump 9 may be any of several conventional types to produce a pressurized hydraulic fluid output when shaft 72 is driven. A pulley is normally mounted on shaft 72 for driving the assembly with a V-velt. The hydraulic pump is mounted to plate 48 with shaft 72 extending between the legs of the bifurcated element 48. The pump is secured to the straddling legs by bolt connectors 56 and 58. These bolts are inserted through elongated slots 60 and 62 on the legs of the pump mount plate 48. These slots allow limited adjustment of the pump 9 toward or away from generator 11. The peripheral configuration 54 of pump 9 may be of any of several different types.

Pump mount 48 is secured to support platform 66 by suitable bolts 50 and 52. Mount 48 may be placed so that its legs extend forwardly out on extension 40 of the platform 66, if desired. Extending downwardly from platform 66 is a pair of ears 46 and 47 which are adjustably connected to the end 26 of straight leg 18 by bolts 42 and 44. This end of the leg includes a plurality of adjacent like openings 24 which form connector means for the bolts, enabling the platform and pump mount to be secured thereto at any of several adjacent positions. This end of the leg 18 is also secured to one of the conventional generator lugs 49 by a bolt 20. These lugs, found on all generators, serve as the generator mounting elements to the engine. They are rigid supports and form excellent mounting means for the pump and bracket assembly.

Secured to the second of these lugs 51 by a bolt 12 is the curved or J-shaped leg 13. This leg has a straight upper end 32 and an arcuately curved lower end 16 adapted to follow the periphery of the generator 11 enabling bolt 12 to be placed through one of several alternate adjacent spaced openings 14 for securement to lug 51. Lug 51 may be directly opposite lug 49 or circumferentially removed from lug 49 less than 180°. The straight portion of the leg extends tangentially from the periphery of the generator for securement to end 36 of the straight leg 18 by bolt connector 28. This bolt connector may extend through any of several adjacent connector openings 34 of leg 18 and any of several connector openings 30 on the straight portion of the curved leg. If desired, the two ends of the straight leg may be offset at 38 to provide an optimum fit.

In the form of the invention illustrated in FIG. 1, the shaft 72 of hydraulic pump 9 is driven by a suitable V-belt (not shown) extending from the drive shaft of the engine. If desired, the same belt may extend around the generator pulley, the pump pulley, and the crank shaft pulley. The generator pulley 59 is secured by nut 68 to its shaft. If separate belts are employed to drive the generator and pump, the generator may be driven with V-belt 70. Preferably, however, the arrangement illustrated in FIGS. 5 through 9 and described hereinafter is employed.

Figure 3:
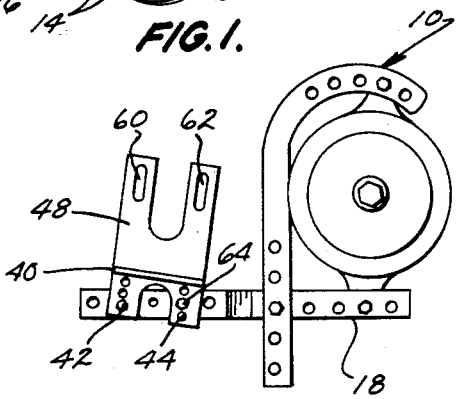
FIG. 3 is a front elevational view of the bracket and generator in FIGS. 1 and 2, shown in a different mounting position.
Figure 4:
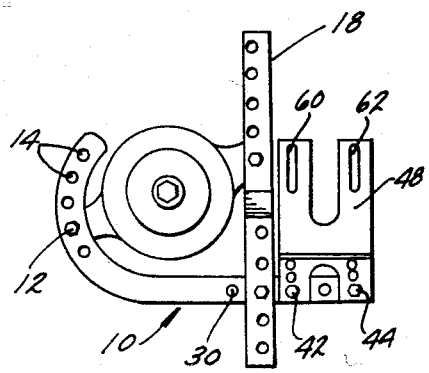
FIG. 4 is a front elevational view of the bracket and generator in FIGS. 1 and 2, shown in a still different mounting position.

When adapting the universal bracket assembly illustrated in FIG. 1 to different types of generators, to enable the pump to be installed in the available space around the generator, or to suit the particular arrangement of mounting lugs on the generator, any of the several positions illustrated in FIGS. 2, 3 and 4 or the countless additional positions possible may be employed. The two legs are connected at various selected relationships utilizing the bolts and openings as connector means. Each of the legs is attached to its mounting lug and to each other in any of various positions. Pump mount 48 is bolted to one or the other leg in any of various different positions utilizing the adjacent connector means. More specifically, in FIG. 2, the bolt 12 extends through the end opening of the several openings 14 in the arcuately curved portion of the J-shaped leg 13, the connector 28 extends through the inner openings of the several openings 30 and 34 of the two crossing legs, and connector 20 mounting the assembly to the upper lug 49 extends through the central opening of the several adjacent openings 24 to support the pump directly above the generator. Alternatively, the pump is supported on a side of the generator utilizing the arrangement in FIG. 3, or is supported on the opposite side of the generator or to a different lug orientation as in FIG. 4.

*Second form*

In FIGS. 5 through 10 is shown a second form of the inventive apparatus including a universal mounting bracket 110. This pump mount bracket includes a curved leg 113 shaped similar to a J with an arcuately curved end and a straight end extending tangentially therefrom. It includes a second leg 118 having a base portion 119 for attachment to the straight end of curved leg 113 by bolt connectors 123. A pump mount plate 148 includes a vertical bifurcated portion having a pair of legs with slots 160 and 162 therein for attaching the hydraulic pump 109 (FIG. 7) thereto. The lower portion of this pump mount 148 includes a base 148′ (FIG. 7) for attachment to the surface of leg 118. Thus, the straight leg 118 really comprises an L-shaped member having a major straight portion. The pump mount plate 148 is also really L-shaped.

The assembly is mounted to the conventional lugs 149 and 151 of a conventional generator or alternator 111 for support. To facilitate mounting in various positions with respect to the generator, and to orient the pump to a particular spacing, the L-shaped leg 118 may be rotated to the position shown at 118a in FIG. 5. Also, the special L-shaped tabs 121 and 123 between legs 118 and 113 and the respective generator lugs 149 and 151 may be secured at various adjacent positions along the legs due to the plurality of openings 134 in leg 118 (FIG. 8) and 114 in leg 113.

Figure 5:
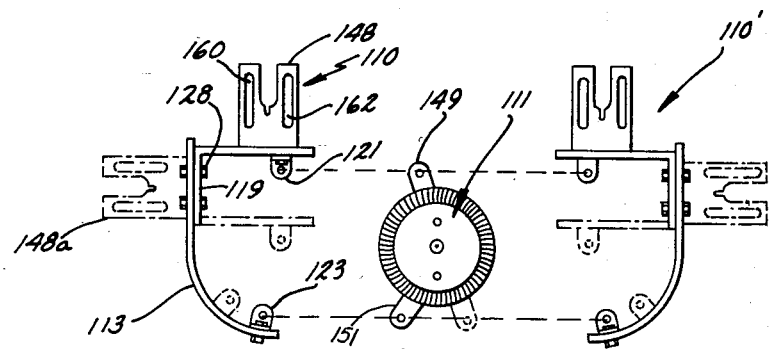
FIG. 5 is an exploded elevational view of a second form of the bracket shown in alternate positions on opposite sides of a generator.

It will be noted from FIG. 5 that bracket 148 may also be mounted in the position shown at 148a when it is attached to the upper end of the J leg rather than to the protruding portion of straight leg 118. Also, as shown in FIG. 5, the entire bracket assembly 110 may be oriented to the alternate mirror image position 110′ on the opposite side of generator 111 to accommodate particular spacing conditions. The important features of the bracket legs are the configuration of one leg with its one end extending around the generator periphery to be secured to one lug and its other leg extending tangentially away from the generator, and the tangential arrangement of the other leg to the generator, past the second lug, to intersect the straight portion of the first leg for attachment thereto. When the bracket legs are interconnected, therefore, their free ends are attached to the generator lugs.

Figure 6:
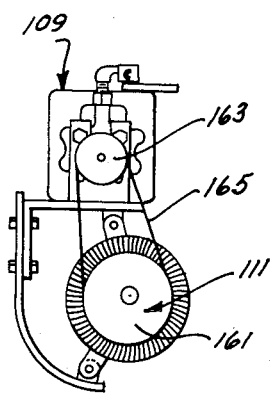
FIG. 6 is a front elevational view of a generator, bracket and pump assembly utilizing the second form of the mounting bracket assembly.
Figures 7, 8:
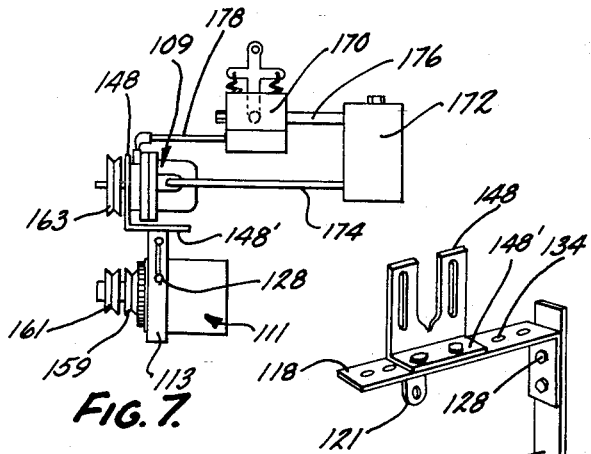
FIG. 7 is a side elevational view of the apparatus illustrated in FIG. 6.
FIG. 8 is a perspective view of the bracket in FIG. 5.

The complete assembly of generator pump and bracket assembly appears as illustrated in FIG. 6 when the pump is mounted above the generator. As shown in FIG. 7, pump 109 may be operably associated with conventional valving control means 170 and reservoir 172 by conduit 174 between the pump and the reservoir, conduit 176 between the reservoir and valve, and conduit 178 between the valve and pump.

In the preferred form of the invention, the pump 109 is driven directly from generator 111 by a special belt 165 (FIG. 6). This is accomplished by driving the main pulley 59 of the generator with a V-belt from the drive shaft of the engine, and attaching a second pulley 161 to the pulley 159 in alignment with pump pulley 163. V-belt 165 moves around pulleys 161 and 163.

Figure 9:
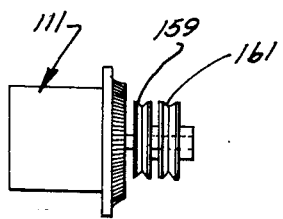
FIG. 9 is a side elevational view of a generator showing a novel pulley mount assembly forming the drive mechanism for the pump.
Figure 10:
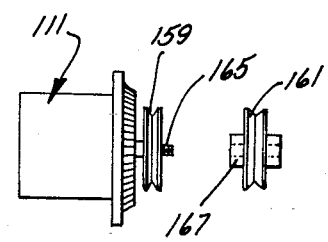
FIG. 10 is a side elevational, partially exploded view of the apparatus in FIG. 9 with the added pump driving pulley shown removed.

Pulley 161 is secured to generator assembly 111 by attaching a threaded stud 165 from pulley 159 of the generator, and threadably securing collar hub 167 of pulley 161 to extended shaft 165 to produce the assembly illustrated in FIG. 9. Thus, when the engine drive shaft rotates the generator pulley 159 and the generator shaft, adjacent pulley 161 will be driven to drive V-belt 165 which rotates the pump pulley 163. The entire arrangement is compact, easy to install, convenient to exchange, and effective in use.

It will be readily seen that by manipulating the components of this assembly with respect to each other, and employing any of the several adjacent connecting means in the combination required, the particular mounting orientation of the hydraulic pump with respect to the generator or alternator can be varied at will to any angular relationship, or to suit any log orientation. Then by simply attaching the special pulley hub 161 to the generator and securing belt 165 therebetween, the pump can be operated directly from the generator shaft, providing a compact, readily assembled arrangement. The bracket can be manufactured in either of the illustrated forms or in forms which are obvious modifications thereof to enable the hydraulic pump to be mounted to any vehicular generator lugs regardless of the location of the space for receiving the pump and of the circumferential orientation of the lugs. It will be realized that when the term generator is used in the claims in this application it includes the obvious "alternator" which is equivalent for these purposes. The claims are not to be limited to the illustrative forms of the invention depicted, but only by the scope thereof and to the reasonably equivalent structures to those defined therein.

I claim:

1. A vehicle generator and pump mounting bracket assembly, comprising: a generator having at least two radially projecting mounting lugs; a pump mounting bracket assembly including a pair of bracket legs, one being secured to one of said lugs, and the other being secured to the other of said lugs; said legs also being attached together with a removable connection; one of said legs having a portion extending around a peripheral portion of said generator to connect to its generator lug, and a second portion extending away from said generator and intersecting the other leg; and a pump mount secured to one of said legs for supporting a hydraulic pump.

2. A vehicle generator and pump mounting bracket assembly, comprising: a generator having at least two radially projecting mounting lugs; a bracket assembly including a pair of bracket legs, one being secured to one of said lugs, and the other being secured to the other of said lugs; said legs being attached together with a removable connection; one of said legs being curved to extend around a peripheral portion of said generator from the other leg to its respective lug; a pump mount secured to one of said legs for supporting a hydraulic pump; and each of said legs including a plurality of adjacent connecting means for varied attachment to the other leg and to said lugs to enable the pump to be oriented in any of several positions when mounted.

3. The assembly in claim 2 wherein said leg extending around said peripheral portion is J-shaped, and said connecting means include a plurality of spaced adjacent openings in both ends of each of said legs.

4. A vehicle generator and pump mounting bracket assembly, comprising: a generator having at least two radially projecting mounting lugs spaced circumferentially from each other around the periphery of the front end of said generator; a pair of bracket elements, one extending in a straight line generally tangentially of said generator and secured to one of said lugs by a removable connector means, the other element having a curved portion extending around a peripheral portion of said generator and attached to the other lug with removable connector means and having a straight portion extending tangentially from said curved portion; said one element intersecting the other element and being attached to said straight portion thereof with removable connector means; a pump mount removably secured to one of said legs to support a hydraulic pump; and said elements having a plurality of spaced openings for allowing varied connections between said elements, and between each element and its respective lug, and between one of said elements and said pump mount.

5. A universal pump mounting bracket assembly for attachment to vehicle generator lugs, comprising: a first bracket leg having a plurality of spaced connecting means on one end for attachment in any of several positions to a first lug of a vehicle generator; a second bracket leg having a portion secured to said first leg, and a curved portion to arc a peripheral portion of a generator, and including a plurality of connecting means on said curved portion for attachment in any of several positions to a second lug of a vehicle generator; and a pump mount attached to one of said legs and including means for mounting a hydraulic pump.

6. The assembly in claim 5 wherein at least the major portion of said first leg is straight, with one end adapted to be affixed to a generator lug, said second leg is substantially J-shaped with the straight portion affixed to the second end of said first leg and the curved portion adapted to be secured to a second lug, and wherein both ends of each leg include a plurality of adjacent, spaced connector openings.

7. A universal mounting bracket for mounting an object on a pair of spaced supports, comprising: a pair of intersecting arm members, each of said arm members having means for attaching it to one of said spaced supports at one of a plurality of positions along its length, and having means for attaching it to the other arm member at one of a plurality of positions along its length, an object-supporting bracket member; and means for attaching said object-supporting bracket member to one of said arm members in a position variable transversely to the length of said arm member, said object-supporting bracket member having means for supporting an object at an adjustable distance from said object-supporting bracket member.

8. A universal mounting bracket for mounting an object on a pair of spaced supports, comprising: a pair of intersecting arm members, each of said arm members having means for attaching it to one of said spaced supports at one of a plurality of positions along its length, and having means for attaching it to the other arm member at one of a plurality of positions along its length; a platform bracket member having means for attaching it to either of said arm members at various inclinations with respect thereto; and an object-supporting bracket member having means for attaching it to said platform bracket member in a position variable transversely to the length of said arm members, and having means for supporting an object at an adjustable distance from said platform bracket member.

9. A universal mounting bracket for mounting an object on a pair of spaced supports, comprising: a pair of intersecting arm members at least one of said arm members being generally J-shaped, each of said arm members having means for attaching it to one of said spaced supports at one of a plurality of positions along its length, and having means for attaching it to the other arm member at one of a plurality of positions along its length; a platform bracket member having means for attaching it to either of said arm members at various inclinations with respect thereto; and an object-supporting bracket member having means for attaching it to said platform bracket member in a position variable transversely to the length of said arm members, and having means for supporting an object at an adjustable distance from said platform bracket member.

10. A universal mounting bracket for mounting a hydraulic pump on an automotive generator to which it is connected by a drive belt, comprising: a pair of intersecting arm members at least one of said arm members being generally J-shaped, each of said arm members having means for attaching it to one mounting bolt of said generator at one of a plurality of positions along its length, and having means for attaching it to the other arm member at one of a plurality of positions along its length; a platform bracket member having means for attaching it to either of said arm members at various inclinations with respect thereto; and a pump-supporting bracket member having means for attaching it to said platform bracket member in a position variable transversely to the length of said arm members, and having means for supporting said pump at an adjustable distance from said platform bracket member to permit adjusting the tension of said belt.

References Cited by the Examiner

UNITED STATES PATENTS

| | | | |
|---|---|---|---|
| 2,544,963 | 3/51 | Livingston | 248—230 |
| 2,717,139 | 9/55 | Jewell | 248—208 |
| 2,750,143 | 6/56 | Sjoboen | 248—317 |
| 2,961,208 | 11/60 | Luenberger | 248—16 |

FOREIGN PATENTS 640,865   1/37   Germany.

CLAUDE A. LE ROY, *Primary Examiner.*